Aug. 31, 1937.  C. H. FLESHMAN  2,091,755
APPARATUS FOR COOLING AND DISPENSING BEER
Filed July 20, 1936
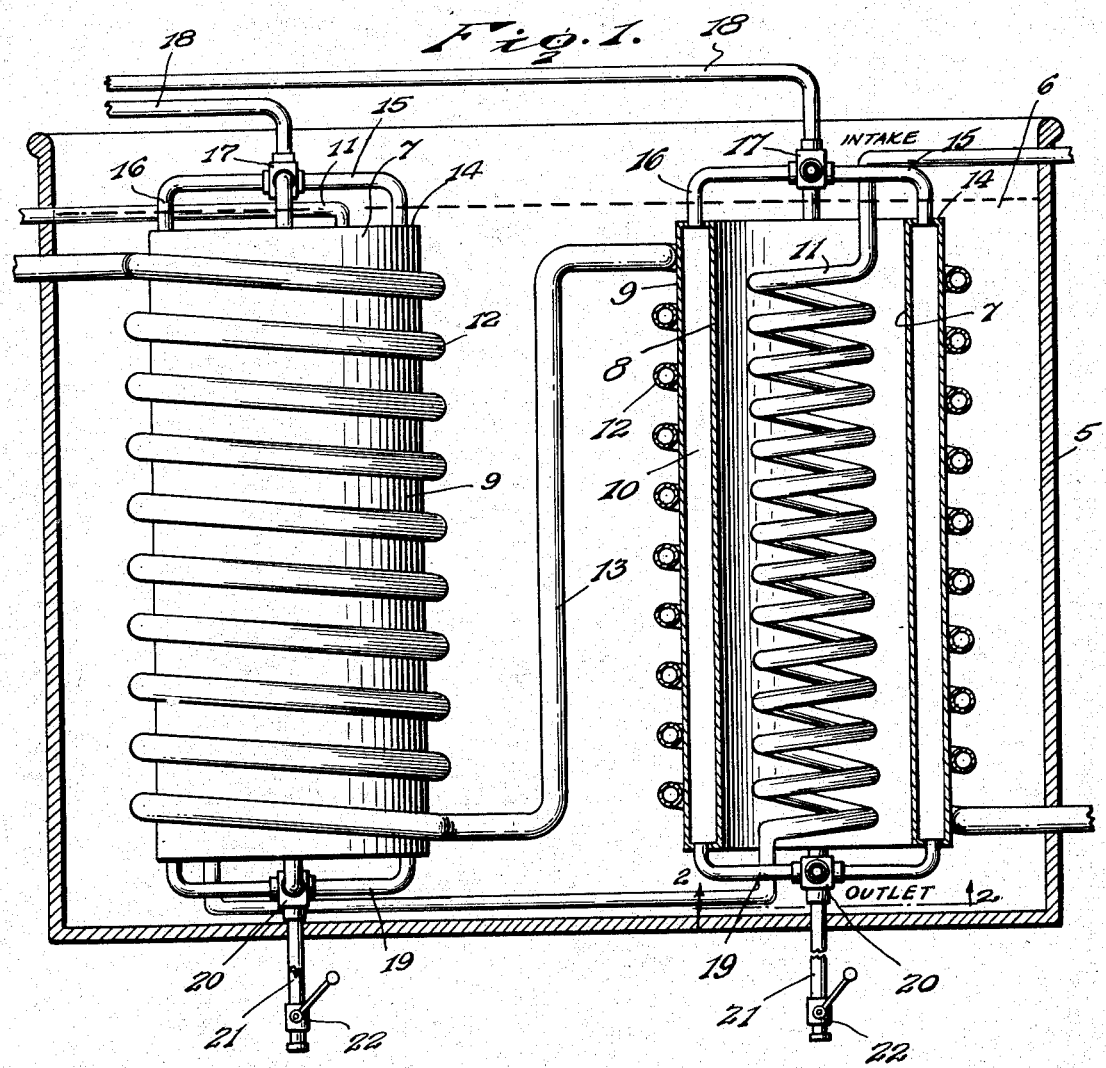
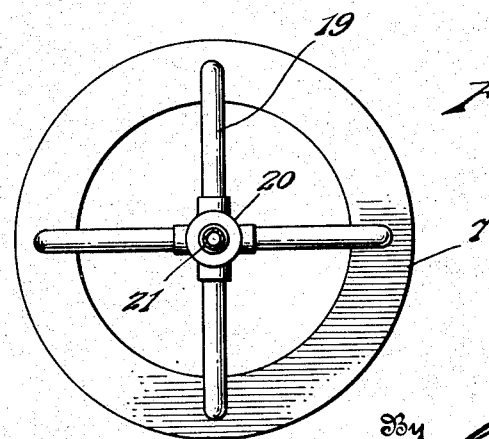
Inventor
C. H. Fleshman.
By Lacey & Lacey, Attorneys Patented Aug. 31, 1937

2,091,755

UNITED STATES PATENT OFFICE 2,091,755

APPARATUS FOR COOLING AND DISPENSING BEER

Carl H. Fleshman, Albany, N. Y.

Application July 20, 1936, Serial No. 91,586

6 Claims. (Cl. 225—1)

This invention relates to apparatus for cooling and dispensing beverages and more particularly to a device especially designed for cooling and dispensing beer.

The object of the invention is to provide an apparatus of simple and efficient construction by means of which beer and other beverages dispensed over a bar or in a restaurant may be maintained at a uniform cool temperature regardless of the temperature of the supply of beer delivered under pressure to the apparatus.

A further object of the invention is to provide a combined cooling and dispensing apparatus including a double wall cylindrical beer container having inner and outer cooling coils extending the entire height thereof and containing a suitable refrigerant, means being provided for supporting the container within a brine tank or vat so that the cooling coils will be constantly submerged within the brine solution.

A further object is to provide the upper and lower ends of the cylindrical beer container with intersecting distributing pipes communicating at spaced intervals with the interior of said container and provided at their points of intersection with coupling members, one of which is connected with a keg of beer or other source of supply and the other with a dispensing faucet so that beer under pressure from the keg will enter the top of the container in spaced downwardly directed quiescent streams and thus be thoroughly and uniformly cooled in said container before delivery to the dispensing faucet.

A still further object of the invention is generally to improve this class of devices so as to increase their utility, durability and efficiency.

In the accompanying drawing forming a part of this specification and in which similar numerals of reference indicate corresponding parts in all the figures of the drawing, Figure 1 is a vertical sectional view, partly in elevation, of a combined cooling and dispensing apparatus constructed in accordance with the present invention.

Figure 2 is a transverse sectional view taken on the line 2—2 of Figure 1 and looking in the direction of the arrows.

The improved cooling and dispensing apparatus forming the subject-matter of the present invention comprises a tank or vat 5 adapted to contain a suitable brine solution 6 and within which is submerged one or more containers 7 adapted to receive the beer or other beverage to be cooled. The containers 7 are each preferably cylindrical in shape and provided with inner and outer walls 8 and 9 defining an intermediate chamber 10 entirely surrounding the cylindrical container and extending the entire height thereof, said chamber being adapted to receive beer or other liquid to be cooled and dispensed.

Arranged within the central portion of each cylindrical container 7 is a vertically disposed cooling coil 11 adapted to receive a suitable refrigerant and surrounding the exterior of each cylindrical container is a larger cooling coil 12 also adapted to receive a refrigerant, the large coils 12 of adjacent containers being connected by a branch pipe 13 immersed within the brine solution between the containers, as shown.

Communicating with the upper end of each container 7 at spaced intervals around the top 14 thereof are horizontally disposed intake distributing pipes 15 having depending portions 16 for directing beer from a suitable source of supply downwardly within the chamber 10. The distributing pipes 15 are preferably disposed at right angles to each other and the inner ends thereof at their points of intersection are connected with a suitable coupling 17. Fitted in the upper end of each coupling 17 is a pipe 18 leading to a keg of beer or other suitable source of supply, not shown, the arrangement of parts being such that beer under pressure from the supply keg will be delivered through the pipes 18 to the couplings 17 and thence through the intake distributing pipes 15 into the chamber 10 of the adjacent container. Disposed at the bottom of each beer container 7 are intersecting outlet distributing pipes 19 similar in construction to the intake distributing pipes 15 and which communicate with the lower portion of the liquid receiving chamber 10. The outlet distributing pipes 19 are fitted in the bottom wall of each container 7 at spaced intervals around the periphery thereof and the inner ends of said outlet distributing pipes are united by a coupling 20 to which is secured a depending pipe 21 carrying a dispensing faucet 22 of any approved construction.

In operation, beer under pressure from the supply keg is delivered through the pipe 18 and distributing pipes 15 into the chamber 10 of the adjacent container 7 where the beer will be uniformly cooled by the inner and outer coils 11 and 12 for delivery to the dispensing faucet 22.

It will be noted that as the depending pipes 16 are arranged at spaced intervals around the top of the container 7, the beer will be delivered in the form of quiescent streams into the chamber 10 and thus prevent the warm beer from the supply keg from displacing the cool beer in said chamber 10 and being delivered to the faucet without being properly cooled, which is often the case where the beer enters the top of the container at one point only. It will, furthermore, be noted that inasmuch as the outlet distributing pipes 14 communicate with the liquid chamber 10 at spaced points around the bottom thereof, a constant supply of uniformly cool beer is always assured for delivery to a customer.

The construction of the tank 5 and its associated parts is such that the apparatus may be readily used as part of any standard beer equipment and the employment of cracked ice for maintaining the beer cool is entirely dispensed with.

It will, of course, be understood that the devices may be made in different sizes and shapes and as many beer dispensers may be mounted in the tank or vat as is found desirable or necessary, but two being shown in the present instance, one for light and the other for dark beer.

From the foregoing description it is thought that the construction and operation of the device will be readily understood by those skilled in the art and further description thereof is deemed unnecessary.

Having thus described the invention, what is claimed as new is:

1. An apparatus of the class described comprising a double wall liquid container, cooling coils disposed adjacent the inner and outer walls of the container, means for supplying liquid in spaced quiescent streams within the container adjacent the top thereof, distributing pipes connected with the container adjacent the lower end thereof, and a dispensing faucet connected with said distributing pipes.

2. An apparatus of the class described comprising a double wall beer container, cooling coils disposed adjacent the inner and outer walls of the container, intake distributing pipes connected with the top of the container, means for supplying beer under pressure to the intake distributing pipes, outlet distributing pipes connected with the container at the bottom thereof, and a dispensing faucet connected with and common to all of the outlet distributing pipes.

3. An apparatus of the class described comprising a double wall cylindrical beer container, cooling coils disposed adjacent the inner and outer walls of the container, intersecting intake distributing pipes connected with the top of the container at spaced intervals thereon, a coupling connected with the intake distributing pipes at the intersection thereof, a pipe connected with the coupling and leading to a source of beer supply, intersecting outlet distributing pipes communicating with the interior of the container at the bottom thereof, and a dispensing faucet connected with the outlet distributing pipes.

4. An apparatus of the class described comprising a double wall beer container, an inner cooling coil disposed at the center of the container, an outer cooling coil surrounding said container, intersecting intake distributing pipes having downwardly directed branch pipes communicating with the interior of the beer container at spaced intervals around the top thereof for delivering beer in quiescent streams within the container, a coupling connecting said intake distributing pipes, an intake pipe connected with the coupling and leading to a source of beer supply, intersecting outlet distributing pipes connected with the interior of the beer container at spaced intervals around the bottom thereof, a coupling connecting said outlet distributing pipes, and a faucet connected with the coupling.

5. An apparatus of the class described comprising a double wall beer container having its upper and lower ends closed and its central portion hollow, an inner cooling coil disposed within the hollow portion of the container, an outer cooling coil surrounding said container, means for supplying beer under pressure in downwardly directed quiescent streams within the container at spaced intervals through the top of the container, means for drawing off the beer at spaced intervals through the bottom of the container, and a dispensing device connected with the last-mentioned means.

6. An apparatus of the class described comprising a tank containing a brine solution, a plurality of double wall beer containers disposed within the tank, inner and outer cooling coils associated with each container and adapted to contain a refrigerant, intersecting intake distributing pipes connected with the upper end of each container and leading to a source of beer supply, intersecting outlet distributing pipes connected at spaced intervals with the bottom of each container, and a dispensing faucet associated with each container and common to the adjacent outlet distributing pipes.

CARL H. FLESHMAN.